(No Model.)
S. M. CABORN.
VEHICLE WHEEL.
No. 581,878. Patented May 4, 1897.
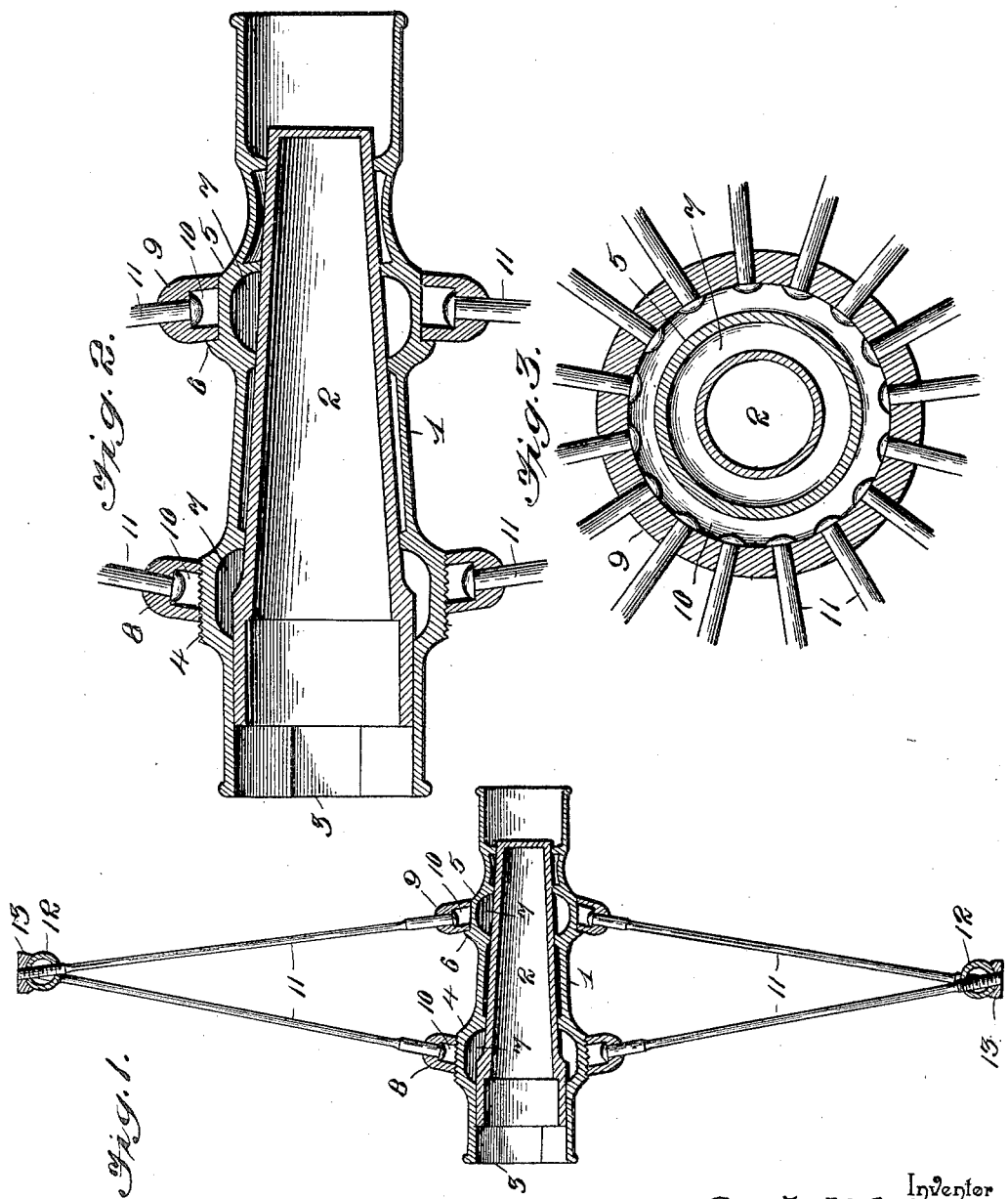

UNITED STATES PATENT OFFICE.

SETH M. CABORN, OF CABORN, INDIANA.

VEHICLE-WHEEL.

SPECIFICATION forming part of Letters Patent No. 581,878, dated May 4, 1897.

Application filed March 16, 1896. Serial No. 583,435. (No model.)

*To all whom it may concern:*

Be it known that I, SETH M. CABORN, a citizen of the United States, residing at Caborn, in the county of Posey and State of Indiana, have invented a new and useful Vehicle-Wheel, of which the following is a specification.

This invention relates to vehicle-wheels, and has for its object to provide a hub of improved construction and novel means for securing the inner ends of the spokes thereto, whereby when the wheel is set up the distance between the inner ends of the spokes longitudinally of the hub may be increased for the purpose of correspondingly increasing the tension on the spokes.

The invention consists in certain novel features and details of construction and arrangement of parts whereby advantages in point of simplicity and cheapness of manufacture are attained, as hereinafter fully described, illustrated in the drawings, and finally pointed out in the claim hereto appended.

In the accompanying drawings, Figure 1 is a cross-sectional view of the improved wheel. Fig. 2 is an enlarged detail longitudinal section through the wheel-hub, showing the manner of attaching the spokes. Fig. 3 is a detail cross-section through the same.

Similar numerals of reference designate corresponding parts in the several figures of the drawings.

Referring to the drawings, 1 designates the wheel-hub, which tapers longitudinally, and 2 the axle-box, also of tapering form and inserted therein, as shown. The hub 1, which is largest at its inner end, is provided thereat with flattened wrench-engaging surfaces 3, by means of which the hub may be gripped and turned relatively to the rim for tightening the spokes, as will hereinafter appear.

Upon each side of the center of the hub the latter is provided with raised annular seats 4 and 5, the seat 4 being screw-threaded and the seat 5 smooth, but provided at its inner edge with a circumferential flange 6, which flange is, however, of less diameter than the threaded seat. The threaded seat is located near the inner end of the hub, while the smooth seat is located near the outer end, and beneath such seats the hub is cored out, as indicated at 7, for securing lightness. Surrounding the hub are two spoke-rings, one of which (indicated at 8) is threaded to screw upon the seat 4 and the other (indicated at 9) smooth, so that it may allow the hub 1 to slide therethrough until it seats itself against the shoulder or flange 6. Each of said spoke-rings is formed as to its inner surface with an annular groove 10 of a size sufficient to receive the headed inner ends of the spokes 11. These spokes are preferably formed with swell ends or butt-ended extremities, as shown, and the heads at the inner ends thereof lie within the grooves 10 and are capable of turning therein as the outer ends of the spokes are engaged with the rim.

The outer swelled ends of the spokes are threaded and screwed into and through a tubular felly 12, having applied to its outer surface a plano-concave tread 13, into and through which the threaded ends of the spokes may also be screwed. The form and construction of the rim entire may, however, be changed without affecting the scope of the present invention.

In setting up the wheel the spokes are passed through radial perforations in the spoke-rings 8 and 9 and screwed into the felly, as above described. The hub is now inserted through the spoke-rings until the outer ring 9 engages upon the seat 5, after which the hub is turned by a suitable wrench applied to its inner end and the threaded seat 4 turned within the internally-threaded ring 8. As the smooth seat 5 and its flange 6 are of less diameter than the threaded ring 8 and both seats are raised, it is evident that the threaded ring 8 can be moved over the hub to its seat without being rubbed against the hub, and therefore its thread will not be liable to be injured. The ring 9 lodges against the circumferential flange or shoulder 6, and thereafter and upon the further turning of the hub the ring 8 will be moved away from the opposing ring 9, which will effect a separation between the inner ends of the spokes which are arranged in the staggered form, as in the construction of bicycle or suspension wheels, thus effecting the simultaneous tightening of each and every spoke in the wheel. This renders it unnecessary to tighten each spoke independently, which is apt to result in making the rim untrue. In practice the spokes are tightened only slightly and the putting of the spokes under the final tension is accomplished by the turning of the hub, as before described. The seat 5 and circumferential flange 6 are of less diameter than the internal diameter of the ring 8, so that they will readily pass through such ring.

It will be apparent that various changes in the form, proportion, and minor details of construction may be resorted to without departing from the spirit or sacrificing any of the advantages of this invention.

Having thus described the invention, what is claimed as new is—

In a vehicle-wheel, a tapering hub having at its largest end wrench-engaging surfaces and provided on each side of its center with raised, separated, annular seats integral therewith, that nearest the largest end of the hub being threaded and the other smooth, and the latter having an annular shoulder at its edge nearest the threaded seat of less diameter than the threaded seat, combined with two spoke-rings fitting on said seats, that on the threaded seat being threaded and the other smooth to permit the hub to turn therein, substantially as and for the purpose described.

In testimony that I claim the foregoing as my own I have hereto affixed my signature in the presence of two witnesses.

SETH M. CABORN.

Witnesses:
    JAMES L. CABORN,
    F. P. LEONARD.